US006439367B1

(12) United States Patent
Taylor et al.

(10) Patent No.: US 6,439,367 B1

(45) Date of Patent: Aug. 27, 2002

(54) BOWL DIVERTER

(75) Inventors: Matthew G. Taylor, Longwood; Richard B. Rigling, Orlando, both of FL (US)

(73) Assignee: Lockhead Martin Corporation, Owego, NY (US)

( * ) Notice: Subject to any disclaimer, the term of this patent is extended or adjusted under 35 U.S.C. 154(b) by 5 days.

(21) Appl. No.: 09/728,657

(22) Filed: Dec. 1, 2000

(51) Int. Cl.$^7$ ........................ B65G 47/10; B65G 47/46; B07C 9/00

(52) U.S. Cl. .................. 198/370.04; 198/360; 198/568; 209/655; 209/924

(58) Field of Search ............................ 198/370.04, 360, 198/367, 463.3, 568; 209/655, 924

(56) References Cited

U.S. PATENT DOCUMENTS

| | | | | |
|---|---|---|---|---|
| 2,868,245 A | * | 1/1959 | Ernst | 141/248 |
| 3,921,786 A | | 11/1975 | Hejmanowski | |
| 4,043,445 A | | 8/1977 | Wirth | |
| 4,804,078 A | * | 2/1989 | Scata | 198/346.2 |
| 4,889,223 A | | 12/1989 | Bergstrom | |
| 5,269,440 A | | 12/1993 | Bohnert | |
| 6,016,922 A | * | 1/2000 | Burman | 209/517 |
| 6,095,314 A | * | 8/2000 | Fortenbery | 198/360 |
| 6,168,006 B1 | * | 1/2001 | Bytow | 198/360 |

* cited by examiner

*Primary Examiner*—Christopher R. Ellis
*Assistant Examiner*—Gene O. Crawford
(74) *Attorney, Agent, or Firm*—Perkins, Smith & Cohen, LLP; Jerry Cohen; Jacob N. Erlich

(57) ABSTRACT

A sorting and conveying system has a longitudinally extending conveyor having at least one tilt tray, but preferably a plurality, on the conveyor for diverting selected articles from the conveyor. There is at least one hanger for holding a plurality of bags. A chute extends between the tilt tray and the hanger. A movable bowl diverter has an entrance opening near the top adjacent the chute and an exit opening near the bottom, so that articles diverted from the conveyor will be delivered to the exit opening. Means are provided for moving the bowl diverter so that the exit opening is positioned to deliver a selected article into a selected bag on said hanger. There are a plurality of tilt trays along the conveyor and a plurality of hangers so that a selected article on the conveyor may be delivered from a selected tilt tray to a selected bag. Means are provided for mounting the bowl diverter for rotational movement, and there is a drive for rotating the bowl diverter.

4 Claims, 2 Drawing Sheets

BOWL DIVERTER

FIELD OF THE INVENTION

This invention relates generally to an article sorting system and, more particularly, to sorting articles, such as mail, into different bags or sacks at high throughput and high density.

BACKGROUND OF THE INVENTION

In the past, rigid flappers were used in a rigid chute or pop-up belt transfer arrangement on a motorized roller conveyor, but there were several shortcomings of such systems including insufficient speed and sorting density.

U.S. Pat. No. 3,921,786 discloses a conveyer sorter apparatus which includes a conveyer having a diverting arm for intercepting articles to a holding area.

U.S. Pat. No. 4,043,445 discloses a centrifugal rotary transfer apparatus for a multiple tray conveyor having spirally-shaped, conical supporting surfaces each having a pickup vane.

U.S. Pat. No. 4,889,223 discloses a distribution-transferring device for articles to be conveyed incorporated in a conveyor for distributing articles. There is diverting for sorting horizontally from a conveyor onto perpendicular branch conveyors.

U.S. Pat. No. 5,269,440 discloses a vibratory bowl feeder with automatic clean out function having a ramp formed on a bottom surface.

SUMMARY OF THE INVENTION

It is an object of the present invention to provide high throughput and high density diversion of bagged products into different sacks.

It is another object of the present invention to provide a method and apparatus to increase the efficiency of a mail sorting system.

These and other objects are accomplished according to the invention in which a rigid chute connected as an exit from a conveyor leads to a rotating bowl with an exit opening. An array of mail sacks are supported below the bowl. A rotary actuator is rotated to locate the exit opening above a destined mail sack. A package is diverted into any one of, a number of locations, e.g., four locations, in this manner.

The present invention provides a device and a method for receiving a sequence of small packages such as polybags or cartons and sorting them into different mail sack locations as required. Rotary actuators rotate a diverter bowl through 270 degrees thereby directing the flow of packages into, e.g., one of four or more location. Sensors may be used to confirm delivery to the appropriate location.

Thus, when an article is to be bagged into a selected bag at a selected multi-bag site, the product is diverted from the conveyor onto an exit chute from which it is fed into a rotating bowl having a lower exit opening. Below the bowl there is an arrangement of bags, such as four, and the bowl is controlled in its movement so that the exit opening is positioned above a chosen bag and the article falls by gravity through the exit opening of the bowl and into the selected bag.

The movement of the bowl to divert a selected article into a selected bag is timed so that the bowl is in its correct position for the delivery of the selected bag before the bag has passed completely through the bowl from its entrance opening at its upper end.

The present invention together with the above and other advantages may best be understood from the following detailed description of the embodiments of the invention illustrated in the drawings, wherein:

DETAILED DESCRIPTION OF PREFERRED EMBODIMENTS

A conveyor 12 carries a plurality of tilt trays or carts 10 which are moved by the conveyor 12 and follow the conveyor path. When an article 14 on the tray 10 is to be deposited at a selected location, the tray 10 tilts in the direction the article 14 is to be fed and the article 14 moves off of the tilt tray 10 and into a sorting device. The use of tilt tray or carts is known in this art, U.S. Pat. No. 6,112,879 being a recent example of one such device as used for a package sorting conveyor.

Figures 1, 4A, 4B:
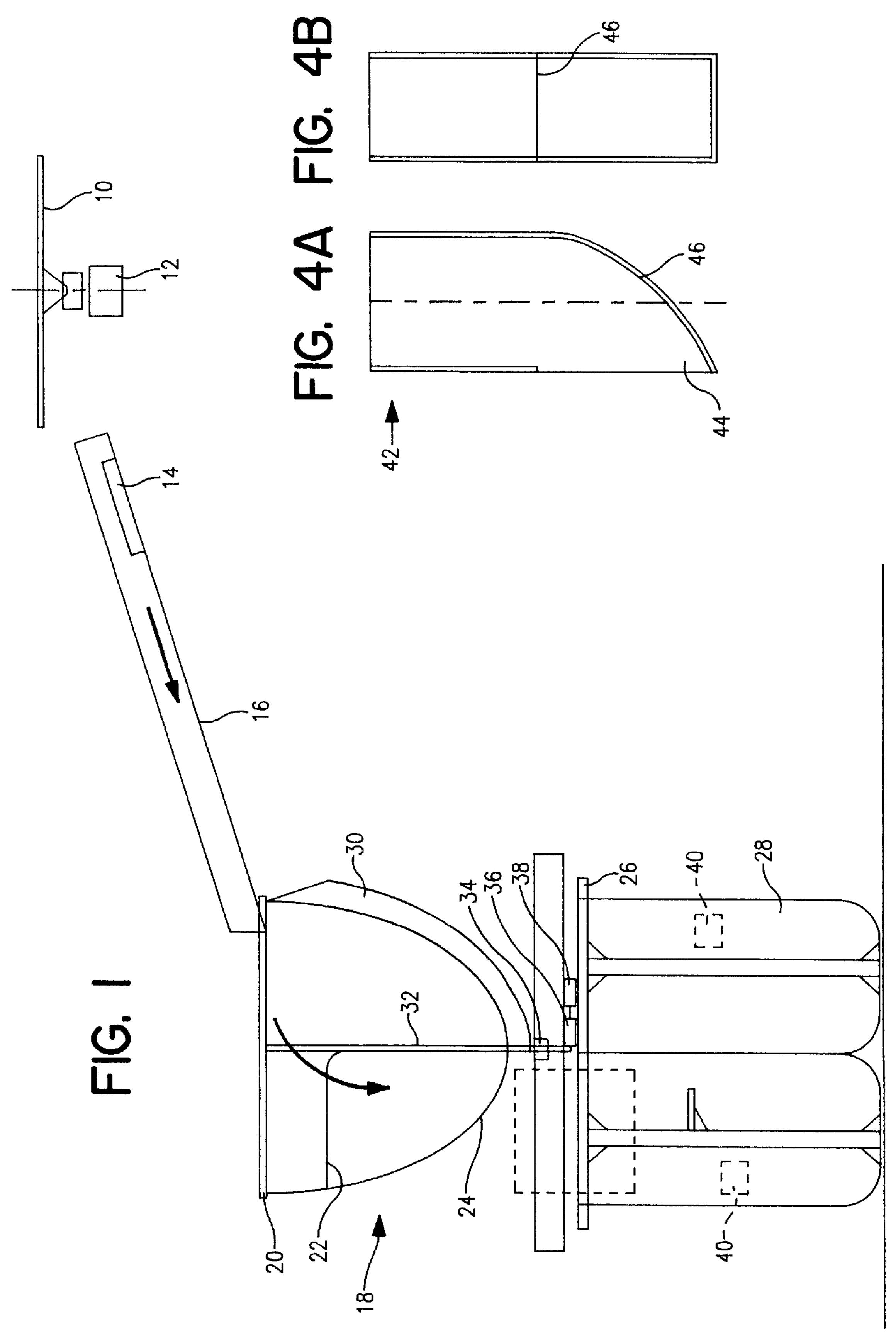
FIG. 1 is a schematic side view of a tilt tray, feed chute, feed bowl and bag hanger.
FIG. 4A is a side view of an alternate diverter.
FIG. 4B is a front view of the alternate diverter shown in FIG. 4A.
Figure 2:
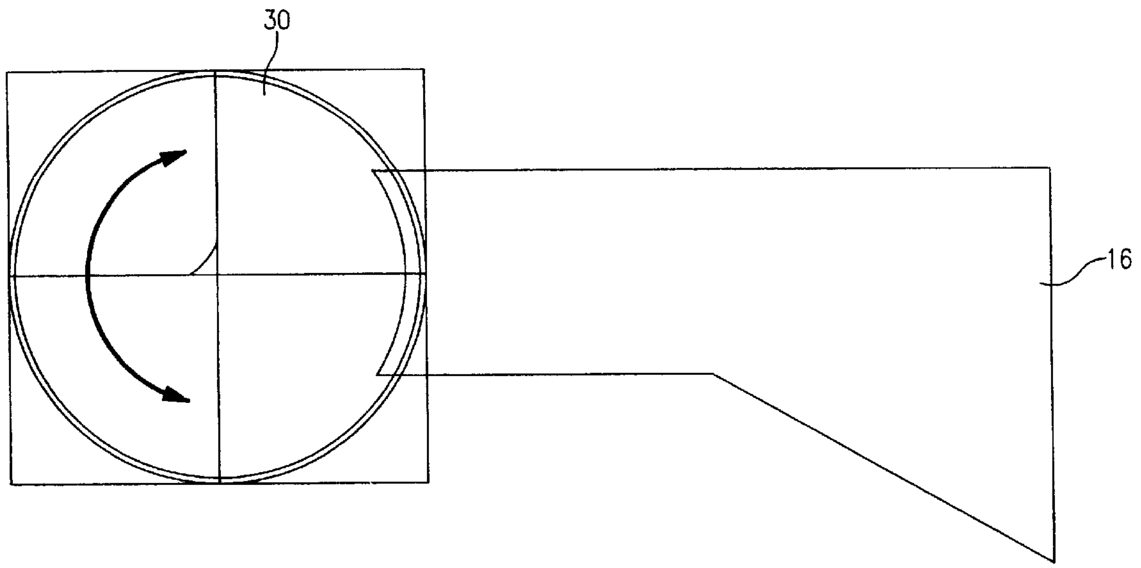
FIG. 2 is a schematic plan view of the feed chute and feed bowl.
Figure 3:
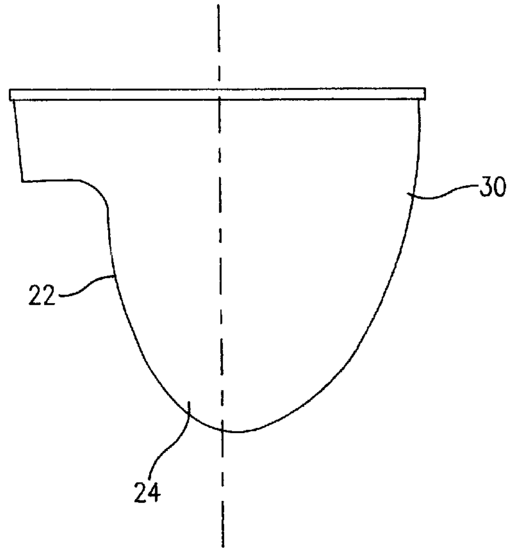
FIG. 3 is a schematic side view of the feed bowl.

In the present invention there may be a plurality of locations at which the tilt trays deposit articles. After being deposited at a selected location, the article moves down a chute 16 located at each deposit location and into a diverter bowl assembly 18 which includes a bowl 30. The bowl is mounted on a shaft 32 mounted for rotation in a bearing 34, Gearing 36 is connected to the shaft to rotate the shaft, and a motor 38 drives the gearing 36. The particular arrangement shown is circular at the top 20 (but could have a different shape) and has an opening 22 at one side of the bottom 24, The bowl is arranged to rotate and thus, the rotational position of the bowl determines where its contents are deposited. In FIG. 1 there is a bag hanger 26 which holds four bags 28, but a different arrangement with a different number of bags could be used.

The position of the bowl determines which bag receives the article which is being sorted.

In operation, articles 14 such as packages are discharged from a tilt tray 10 (although a cross-belt or similar sorter device cold be used) and onto a chute 16. A rotating bowl 18 with a single opening 22 is positioned at the end of the chute 16 A hanger 26 holding four mail bags 28 are tightly arranged in a square below. The bowl 18 is rotated to position the opening 22 above a mail bag 28. The package 14 is discharged onto the chute 16 and diverted by the bowl 18 into the correct mail bag 28. This provides up to four times the sorting density compared to prior devices and a shorter sorted may be used as a result.

Thus, a rigid chute is connected as an exit from the conveyor and leads to a rotating bowl with an exit opening. An array of mail sacks are supported below the bowl. A rotary actuator is rotated to locate the exit opening above a destined mail sack. A package is diverted into any one of, a number of locations, e.g., four locations, in this manner.

The present invention provides a device and a method for receiving a sequence of small packages such as polybags or cartons and sorting them into different mail sack locations as required. Rotary actuators rotate a diverter bowl through 270 degrees thereby directing the flow of packages into, e.g., one of four or more location. Sensors may be used to confirm delivery to the appropriate location.

Thus, when an article 14 is to be bagged into a selected bag 28 at a selected multi-bag site, the product is diverted from the conveyor onto an exit chute 16 from which it is fed into the rotating bowl 30 having a lower exit opening 22. Below the bowl 30 there is an arrangement of bags 28, such as four, mounted on a hanger 26 and the bowl 30 is controlled in its movement so that the exit opening 22 is positioned above a chosen bag 28 and the article 14 falls by gravity through the exit opening 22 of the bowl 30 and into the selected bag 28.

The movement of the bowl 30 to divert a selected article 14 into a selected bag 28 is timed so that the bowl is in its correct position for the delivery of the selected bag before the article has passed completely through the bowl from its entrance opening at its upper end.

Sensors 40 may be used to confirm delivery of the articles.

FIGS. 4A and 4B are two views of an alternate type of diverter. As can be seen the bowl diverter 42 is more in the form of a tube than a bowl as was the first type of diverter. The bottom 44 is rounded where the opening 46 is located as with the first type diverter. The bottom 44 can be square as shown is FIG. 4B. The opening 46 at the top can also be square (or rectangular) or can be round.

What is claimed is:

1. In a sorting and conveying system having a longitudinally extending conveyor, the improvement comprising:

a. a conveyor;

b. at least one tilt tray on the conveyor for diverting selected articles from said conveyor;

c. at least one hanger for holding a plurality of bags;

d. a chute extending between the tilt tray and the hanger;

e. a movable bowl diverter having an entrance opening near the top adjacent said chute and an exit opening near the bottom, so that articles diverted from the conveyor will be delivered to said exit opening.

2. The improvement as defined in claim 1 further comprising means for moving the bowl diverter so that the exit opening is positioned to deliver a selected article into a selected bag on said hanger.

3. The improvement as defined in claim 2 wherein there are a plurality of tilt trays along the conveyor and a plurality of hangers so that a selected article on the conveyor may be delivered from a selected tilt tray to a selected bag.

4. The improvement as defined in claim 2, further comprising means for mounting the bowl diverter for rotational movement, and a drive for rotating the bowl diverter.

* * * * *